FIGURE 3
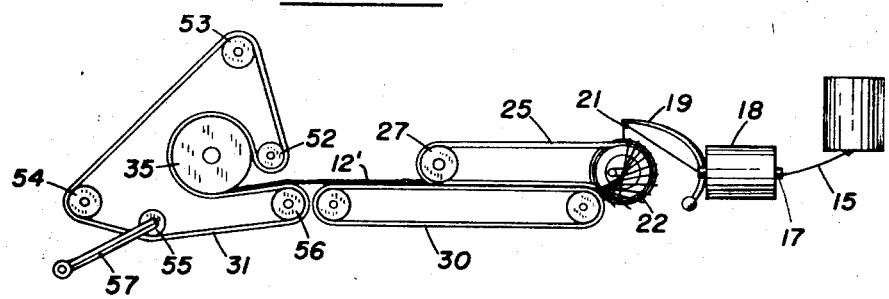
FIGURE 4
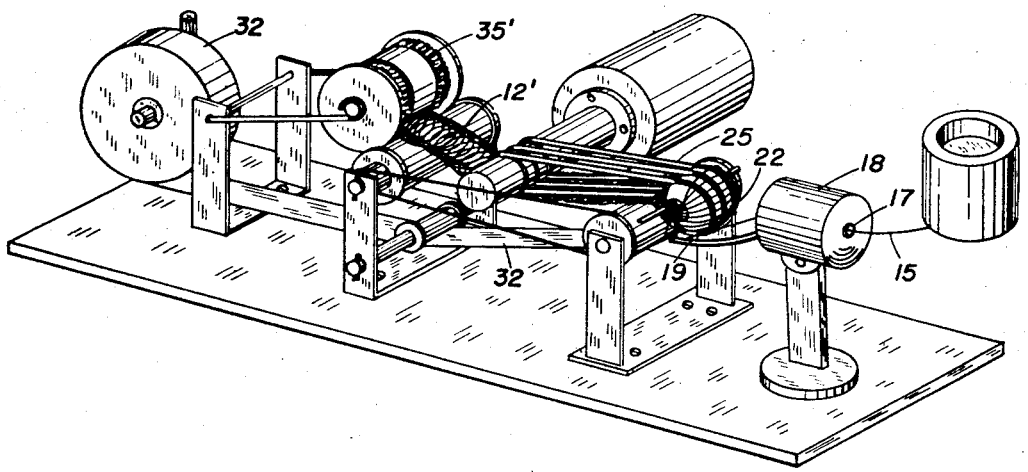
INVENTOR
WARREN WENDELL DRUMMOND
BY
ATTORNEY March 4, 1969          W. W. DRUMMOND          3,430,312
FIBER WINDING MACHINE Original Filed May 16, 1963

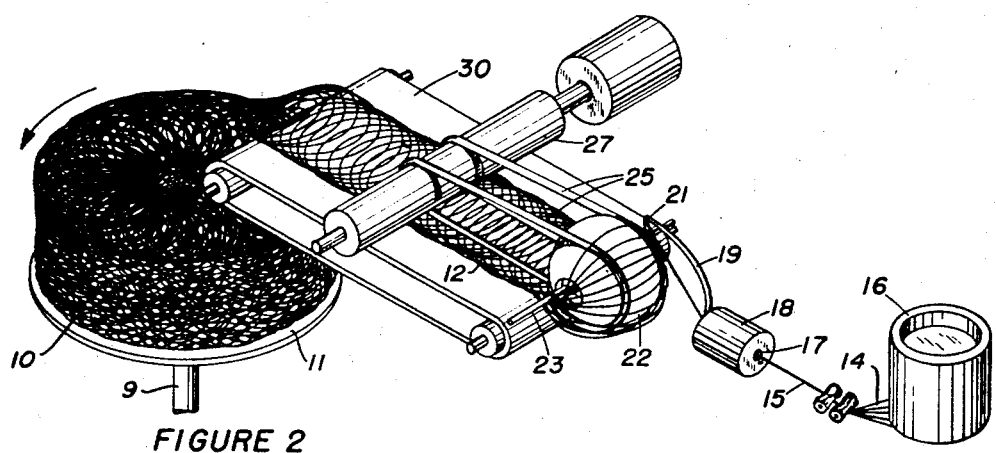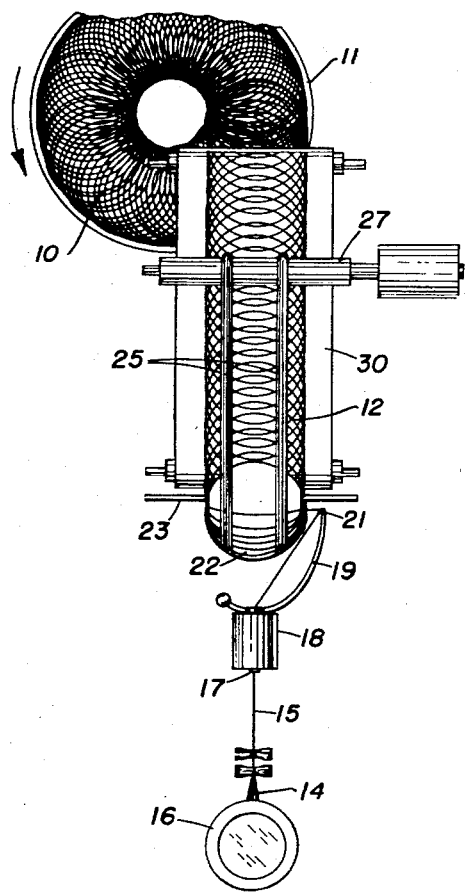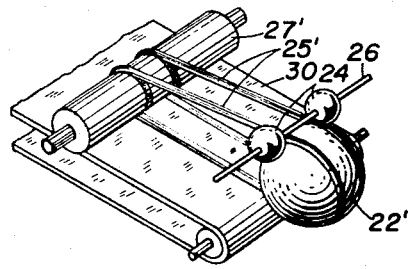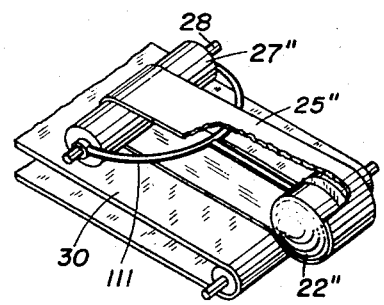

INVENTOR
WARREN WENDELL DRUMMOND

BY
ATTORNEY

United States Patent Office 3,430,312
Patented Mar. 4, 1969

3,430,312
FIBER WINDING MACHINE
Warren Wendell Drummond, 4173 Timberlane Drive,
Allison Park, Pa. 15101
Continuation of application Ser. No. 281,861, May 16,
1963, which is a continuation-in-part of application
Ser. No. 834,973, Aug. 20, 1959, now Patent No.
3,120,689, dated Feb. 11, 1964. This application Jan.
31, 1967, Ser. No. 613,393
U.S. Cl. 28—1                         7 Claims
Int. Cl. D02g 3/00

ABSTRACT OF THE DISCLOSURE

Apparatus for forming a ribbon of partially overlapped yarn loops including a pair of hemispherical shells mounted for rotation about a common axis and spaced apart to provide a central opening therebetween through which a driving member extends to engage the inner surfaces of the shells for rotating the same. A rotating yarn guide lays loops of yarn around the shells as they rotate to form a ribbon which is then stripped from the shells. Means are provided to sever the loops of yarn in the area of the central opening between the shells.

This application is a continuation of application Ser. No. 281,861 filed May 16, 1963, now abandoned, which application was a continuation-in-part of my copending application Ser. No. 834,973 filed Aug. 20, 1959 and now U.S. Patent No. 3,120,689 granted Feb. 11, 1964.

This invention relates to a method and a machine for continuously winding fiber into packages from which the fiber may be rapidly unwound and recovered, and more particularly relates to a method and a machine for winding fiber into a plurality of overlapping whorled convolutions of a configuration similar to that which would be obtained by horizontally removing the arbor from a reel on which a single layer of fiber was wound thereby causing the standing tubular convolutions of fiber to collapse into overlapping convolutions.

This invention provides a method for winding fiber continuously while subjecting it to substantially constant mechanical stress. It is desirable to package fibers of ceramic, glass or synthetic resins subject to uniform stresses to enable dyes that may later be applied to the fibers to uniformly color the fiber. The affinity of many dyes for fibrous glass and synthetic resins is materially affected by the tension to which the fibers have been subjected during operations preceding the dyeing process.

In spool winding operations in which a driven arbor turns a spool upon which a fiber is wound, a constant speed of rotation of the arbor results in the fiber being wound at increasingly great linear speeds as the diameter of the spool increases, and causes the tensile stress on the fiber to increase in corresponding manner. In addition, the pressure on the fiber near the core of the spool is increased as outer layers of fiber are wound onto the spool and sizing on the fiber may be squeezed between the windings on the spool and be rendered useless. In addition, instantaneous fluctuations in the linear speed of fiber travel may occur if the fiber is fed through a reciprocating guide piece. A fiber is often damaged by the rapid change of motion of the traversing guide and may be stressed to failure.

On a machine of this invention continuous winding of a fiber can be provided.

This invention provides a means for winding a continuous length of fiber, subject to uniform stresses, into a compact package from which the fiber may be unwound without tangling or snarling. The uniform stress on the fiber enables the fiber to be dyed without exhibiting a variable affinity for the dye composition. Fibers which are wound in the manner of this invention may be placed on a moving conveyor or may be wound into packages continuously and without interruption while processing or packaging changes are made. Spool changes can be made without interrupting the winding operation.

It is an object of this invention to provide a method and a machine for continuously removing fiber from a spinning operation and placing it in a compact arrangement for storage or for processing.

It is another object of this invention to provide a method and a machine for packing fibers in a manner which subjects the fibers to uniform stresses along their entire length.

It is another object of the invention to provide a fiber pack in which sizing is not stripped from base layers of fiber by overlayers of fiber which are tightly wound thereon.

It is another object of this invention to provide a fiber pack which can be unwound free of snarling and without breaking at a high rate of speed.

It is another object of this invention to provide a method and a machine for manufacturing ribbons and mats of resin bonded fiber.

Other objects will become apparent from the drawings and from the following detailed description in which it is intended to illustrate the applicability of the invention without thereby limiting its scope to less than that of all equivalents which will be apparent to one skilled in the art. In the drawings, like reference numerals refer to like parts and:

FIGURE 1 is a perspective view of the machine of this invention;

FIGURE 2 is a plan view of the machine of FIGURE 1;

FIGURE 3 is a schematic elevation of a fiber packaging embodiment which may be used in combination with the machine of FIGURES 1 and 2;

FIGURE 4 is a perspective of another embodiment of the machine of this invention;

FIGURE 11 is a perspective view of another embodiment of the machine of FIGURES 1 and 2;

FIGURE 12 is a perspective view of another embodiment of the machine of FIGURES 1 and 2.

Figure 5:
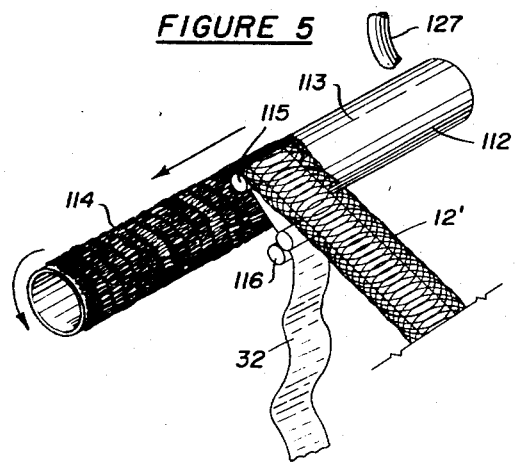
FIGURE 5 is a perspective view of an embodiment which may be used with the machine of FIGURE 4 to manufacture fiber reinforced synthetic resin pipe.

Referring now to FIGURES 1 and 2 there is shown fiber 15 being drawn from bushing 16 which contains molten material such as glass or resin. Fiber 15 may be monofilamentary or may be multifilamentary and comprise filaments 14 as shown. Fiber 15 is passed through hollow shaft 17 of electric motor 18 and through eyelet 21 of flyer 19. It is preferably that the path of travel of fiber 15 be deviated as litlte as possible in passing through shaft 17 and eyelet 21 to minimize stresses in the fiber. Rotatable flyer 19 is fixedly attached to hollow shaft 17 which is mounted by conventional bearing means in motor 18.

When motor 18 is operated hollow shaft 17 and flyer 19 affixed thereto are rotated. Eyelet 21 is revolved about sheaved member 22 and fiber 15 is thereby laid in substantially great circles, defined as circumferences of sheaved member 22 that lay in equatorial planes thereof, by rotation of flyer 19. Simultaneously with the laying of fiber 15, sheaved member 22 is rotatively driven about shaft 23 by driven roller 27 by means of bands 25. Shaft 23 may have an eccentric throw as shown to enable fibers 15 to be wound in great circles on sheaved member 22. Sheaved member 22 is grooved with recesses which accommodate bands 25 in a manner such that bands 25 are substantially flush with the surface of sheaved member 22.

In operation, rotating flyer 19 continuously causes fiber 15 to be laid on sheaved member 22 in substantially equatorial planes and sheaved member 22 is simultaneously rotated about axis 23 so that the equatorial plane in which fiber 15 is laid is constantly changing.

Substantially at the point where bands 25 depart contact with sheaved member 22 wrappings of fiber 15 on member 22 are peeled from sheaved member 22 by bands 25 and form whorled overlapping convolutions 12 of unstressed fiber. Whorled convolutions 12 of fiber 15 are frictionally restrained in the nip of sheaved member 22 and belt 30 as they are removed from sheaved member 22. Fiber 15 is substantially unstressed during the winding and removal operations. Whorled convolutions 12 or fiber 15 are conveyed between belt 30 and bands 25 to a position beyond roller 27 and deposited by belt 30 in unstressed condition on a rotating platform 11 to form package 10. Platform 11 may be raised and lowered by support 9 during formation of package 10 to enable the top of the package to remain at a constant elevation.

In FIGURE 3 is schematically shown an additional embodiment of the machine of FIGURES 1 and 2 which may be used for reeling fiber 15 into packages. Belt 30 is shown in schematic elevation and is identical to belt 30 of FIGURES 1 and 2. Other embodiments of FIGURES 1 and 2 are similarly shown. Belt 31 is shown in readiness for a packaging operation and substantially encircles spool 35 and is supported by bail-mounted pulley 52 an idler pulleys 53, 54, 55 and drive pulley 56. Idler pulley 55 is rotatably supported by tensioning member 57 thereby providing a variable position pulley to take up slack in belt 31. The diameter of spool 35 increases as a package is formed by winding ribbon 12′ onto spool 35. Belt 31 is enabled to remain in constant tension by the action of pulley 55. Spool 35 may be operably removed from the machine by rotating bail-mounted pulley 52 out of position to enable belt 31 to be removed from contact with roll 35. If desired, belts 30 and 31 can be replaced by a single belt.

In FIGURE 4 is shown a modification of the machine of FIGURE 3 wherein tape 32 supports ribbon 12′. Tape 32 is disposed beneath fiber 15 after fiber 15 has been drawn from bushing 16 and wound on sheaved member 22. Tape 32 supports ribbon 12′ while ribbon 12′ is being wound on reel 35′ and obviates the necessity of providing belt support means such as belts 30 and 31 of FIGURE 3. Tape 32 may be coated with pressure sensitive adhesive if desired.

Fiber 15 is operably withdrawn from the package formed on spool 35 either by pulling on the inner fiber end and unwinding the innermost layer of ribbon 12′ on spool 35 or by the pulling on the outer fiber end to unwind the outermost layer of ribbon on the spool. Fiber 15 unwinds without tangling or breaking whether pulled from the core or periphery of the package. It is desirable, however, to unwind spool 35 by means of the inner fiber end to enable a protective wrapper to be placed about the package to prevent tangling of the outermost layers of fiber 15 thereon. When reel 35′ of FIGURE 4 is similarly unwound paper tape 32 drops away as successive layers are uncovered and does not interfere with unwinding operations.

In FIGURE 5 is shown thin wall tubing 112 of metal, synthetic resin, ceramic or other composition being traversed longitudinally and rotatively, as indicated by the directional arrows, by operable means (not shown). Adhesive material such as a thermoplastic or thermosetting resin 113 is coated thereon by applicator 127. Ribbon 12′ is wrapped on tubing 112 to provide reinforced pipe 114. The adhesive may be either pressure sensitive and non-drying or may be hard setting or polymerizable. Tape 32 is passed over idler roller 115 and is drawn between driven rolls 116 away from tubing 112.

Figure 6:
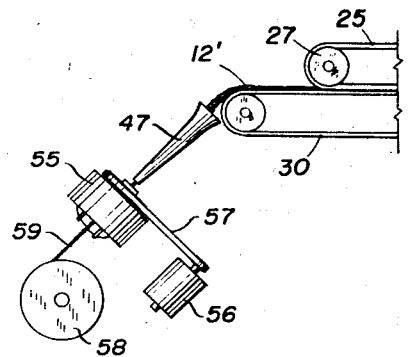
FIGURE 6 is a schematic elevation of an embodiment which may be used in combination with the machine of this invention to manufacture roving.

In FIGURE 6 is shown belt 30, ribbon 12′, drive roller 27 and belt 25 of FIGURES 1 and 2. An attachment for providing roving is shown comprising tapered tubular member 47, and twist bobbin 55 driven by means of belt 57 on motor 56. Roving 59 is wound on reel 50.

The whorled convolutions of ribbon 12′ may be drawn out linearly by being passed into tubular member 47 after being deposited on belt 30 thereby to provide spiral lineations of fiber from the spiral convolutions of fibrous ribbon 12′. A filament may be helically wound about the lineations by twist bobbin 55 to provide roving 59. If desired the convolutions of fiber comprising ribbon 12′ may be cut to provide a plurality of relatively short lengths of fiber in the roving. Means for cutting the fiber is hereinafter described in relation to FIGURES 13, 14 and 15. Roving 59 may be wound on reel 58 and later used in conventional applications or may be unlaid by means of an air blast directed against reel 58 and fiber may be obtained or chaff may be produced if cut fiber is used.

Figure 7:
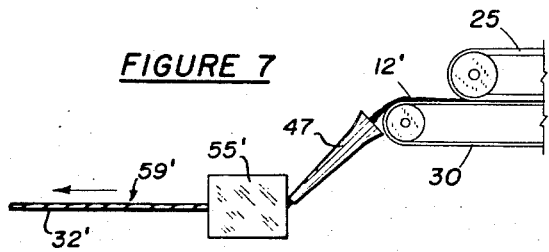
FIGURE 7 is a schematic elevation of an embodiment which may be used with the machine of this invention to manufacture cordage.

In FIGURE 7 is illustrated a machine for making cordage of whorled convolutions of ribbon 12′ and is similar to the machine of FIGURE 6. Helical wrapping of tape 32′ or other casing material is placed about ribbon 12′ after the ribbon is drawn through tapered tubular member 47 to provide cord 59′. Tape 32′ may be secured to the core of fibers in any operable manner. One operable manner is to provide gummed or pressure sensitive tape 32′.

Figure 8:
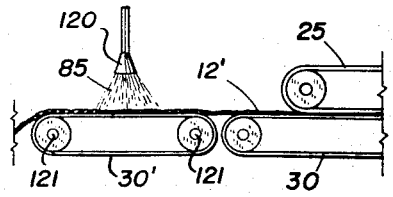
FIGURE 8 is a schematic elevation of an embodiment which may be used with the machine of this invention to manufacture resin bonded fiber.

In FIGURE 8 is shown an embodiment of this invention wherein size 85 is applied to ribbon 12′ by being coated thereon by applicator 120. Flow coating, roller coating or other operable methods of application can be used. Materials other than size such as adhesive or polymerizable resin could also be applied in similar manner. Belt 30′ is supported by rollers 121′ and may be driven independently of belts 30 and 25.

Figure 9:
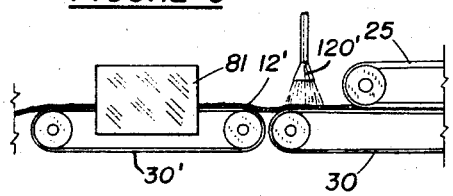
FIGURE 9 is a schematic elevation of an embodiment which may be used with the machine of this invention to manufacture ribbons of resin bonded fibers.

In FIGURE 9 is shown the apparatus of FIGURE 8 wherein applicator 120′ is shown in moved position from applicator 120 of FIGURE 8. Oven 81 is provided adjacent belt 30′ to dry of polymerize the material applied to ribbon 12′ by means of applicator 120′. Ribbon 12′ may be converted into fibrous reinforced sheet material if polymerizable synthetic resin is applied to ribbon 12′ in sufficient quantity to fill the interstices in ribbon 12′. Pressure rolls, platens of other operable means may be provided in conjunction with oven 81 if desired.

Figure 10:
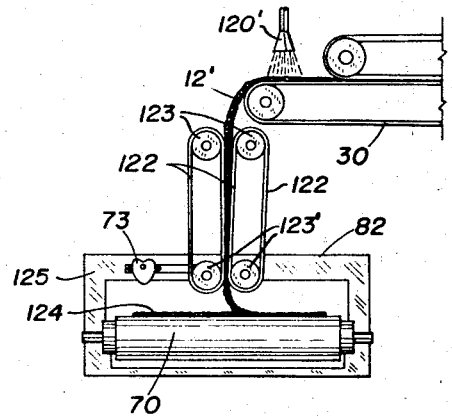
FIGURE 10 is a schematic elevation of an embodiment which may be used in combination with the machine of this invention to manufacture resin bonded fiber matting.

In FIGURE 10 is shown a device for laying ribbon 12′ into a mat. Ribbon 12′ on belt 30 is coated with a polymerizable synthetic resin by means of applicator 120' as shown. The resin coated ribbon 12' is drawn from driven belt 30 by driven belts 122 as shown. Belts 122 are continuous and are supported by rollers 123 and 123'. Rollers 123' are slidably mounted and are reciprocated in a substantially horizontal plane by means of constant speed cam 73 and a push rod in operable relation thereto. Belts 122 frictionally retain resin coated ribbon 12' therebetween and lay ribbon 12' on belt 70 to provide mat 124. Mat 124 can be made in any width or thickness by varying the speed of belt 70 and the distance through which rollers 123' reciprocate, respectively. An oven 125 is provided through which belt 70 and mat 124 thereon travel. The resin on mat 124 is polymerized thereby to provide an adhesively bound fiber mat.

In FIGURE 11 is shown one alternative embodiment of the machine shown of FIGURES 1 and 2 wherein sheaved member 22' is substituted for sheaved member 22 therein. Member 22' is driven by means of belt 25', and drive roller 27' in a manner similar to that described relative to FIGURES 1 and 2. Sheaved member 22' is not provided with an axial shaft, but is retained in position by rotatable guide means 24 on shaft 26 which bears thereagainst. Sheaved member 22' is held in contacting adjacency with belt 30 in operable manner.

In FIGURE 12 is shown another alternative embodiment of the machine of FIGURES 1 and 2 wherein rotatable winding head portions 22" are provided in place of sheaved member 22. Frame 111 provides an internal shaft in winding head portions 22" on which winding head portions 22" are rotatively mounted. Roller 27" is rotatively mounted on frame 111 as shown and belt 25" encircles driven roller 27" and winding head portions 22" thereby frictonally driving the latter members. Winding head portions 22" may comprise substantially cylindrical members as shown or may comprise any other operable configuration which is generated about an axis of revolution.

Figure 13:
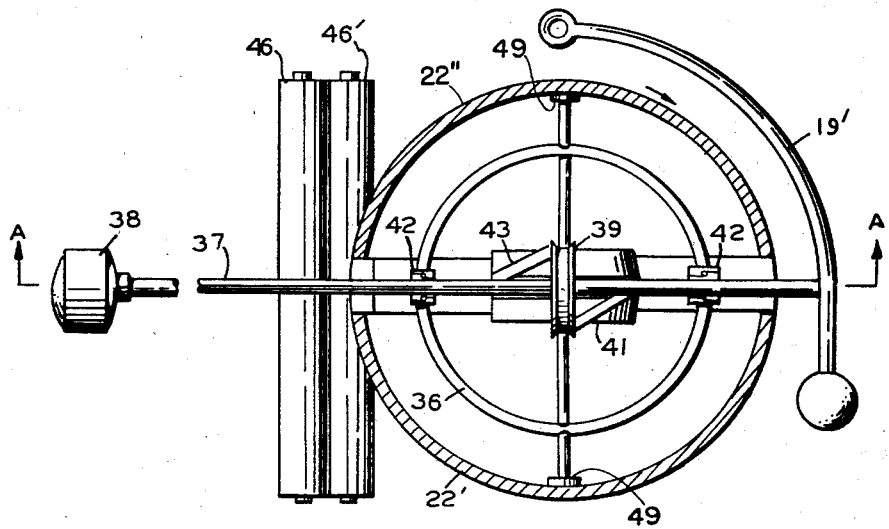
FIGURE 13 is a cross-sectional plan view of another embodiment of the machine of this invention.
Figure 14:
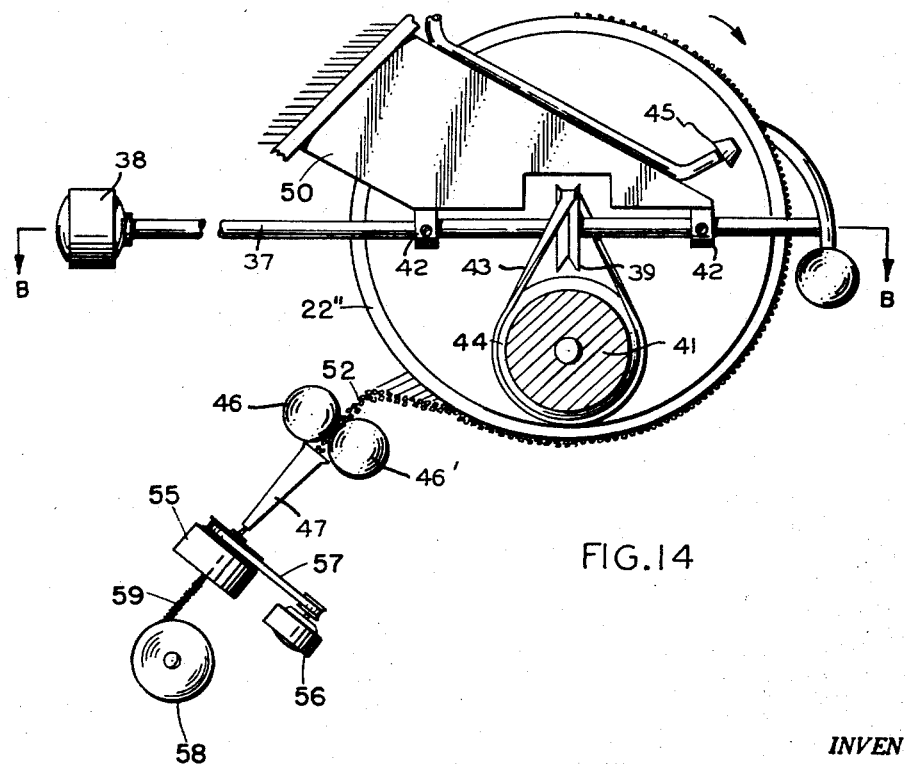
FIGURE 14 is a cross-sectional elevaiton of the machine of FIGURE 13.

In FIGURES 13 and 14 is shown another embodiment of the machine of this invention. The winding head comprising portions 22' and 22" is shown to be of split construction. Each portion 22' and 22" is pivotally attached to frame 36 by bearings 49. Frame 36 is fixedly attached to support member 50. Shaft 37 is driven by motor 38 and is mounted in bearings 42 in frame 36. Pulley 39 and flyer 19' are fixedly attached to shaft 37 and rotate therewith. Belt 43 on pulley 39 causes frictional drive means 41 to be rotated. Drive means 41 is mounted by means of a bracket not shown carried by frame 36 and causes winding head portions 22' and 22" with which it is in friction contact to be turned. Driving means 41 has groove 44 recessed on the periphery thereof wherein driving belt 43 is guided. Gas torch 45, as shown in FIGURE 14, may be provided to cut the fiber laid on winding head 22' before the fiber is passed beyond shaft 37. Torch 45 is disposed so that its flame is positioned between the two half portions 22' and 22" of the winding head. Alternatively, torch 45 may be replaced by a heated wire or knife, a circular saw, or other means which will operably cut the fiber. Other driving arrangements may be used equally well in place of pulley 39 and belt 43 to turn drive roller 41, such as that shown in FIGURE 15. The ratio of the rotational speeds of winding head portions 22' and 22" to that of flyer 19' may be adjusted so that fiber whorls may be removed from the winding head at a fractional rate of the rate at which fiber is laid upon the winding head by flyer 19'. A ratio of 10:1 between the speed of rotation of flyer 19' and the winding head is near optimum for many applications.

As shown in FIGURE 14, whorls 52 may be drawn from the winding head and be passed between pinch rolls 46 and 46' and passed through funnel member 47 and twist bobbin 55. Twist bobbin 55 may be of any conventional construction wherein a fiber is wrapped around yarn or roving. Motor 56 and belt means 57 causes twist bobbin 55 to be rotated and causes thread to be wound around whorls 52. Roving 57 is then reeled onto reel 58.

Figure 15:
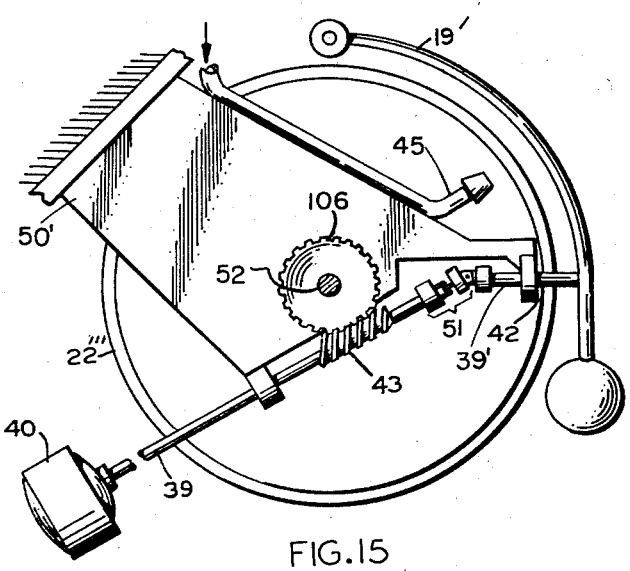
FIGURE 15 is a cross-sectional elevation of another embodiment of the machine of this invention.

In FIGURE 15 another embodiment of the invention is shown wherein winding head portion 22''' similar to winding head portion 22" of FIGURES 13 and 14 and flyer 19' are rotated by gear means. Drive shafts 39 and 39' are coupled by universal joint 51 as shown. Worm gear 43 is fixedly attached to shaft 39 and is operably meshed with spur gear 106 on shaft 52. Motor 40 drives shaft 39 which causes flyer 19' to rotate by means of a drive train comprising universal joint 51 and shaft 39'. Winding head portion 22''' is fixedly attached to shaft 52 and is rotated by rotation of gear 106 on shaft 52.

Gas torch 45 is shown supported by member 50'. The flame of the torch is directed between the half portions of the winding head so as to cut fibers laid on the winding head at the edge of winding head portion 22''' to enable the fibers to pass beyond shaft 39'. Each fiber winding on the apparatus is cut only at one point. Fiber may be removed from any of the winding heads of the apparatuses of FIGURES 13, 14 and 15 in the same manner as previously described, that is, the foremost portion of each whorl wound on the winding head is uncut and after the first whorl is manually removed and placed between driven pinch rolls 46 and 46' (FIGURES 13 and 14) each whorl in succession as it is drawn through the pinch rolls draws the next succeeding whorls into pinch rolls 46 and 46'.

Figure 16:
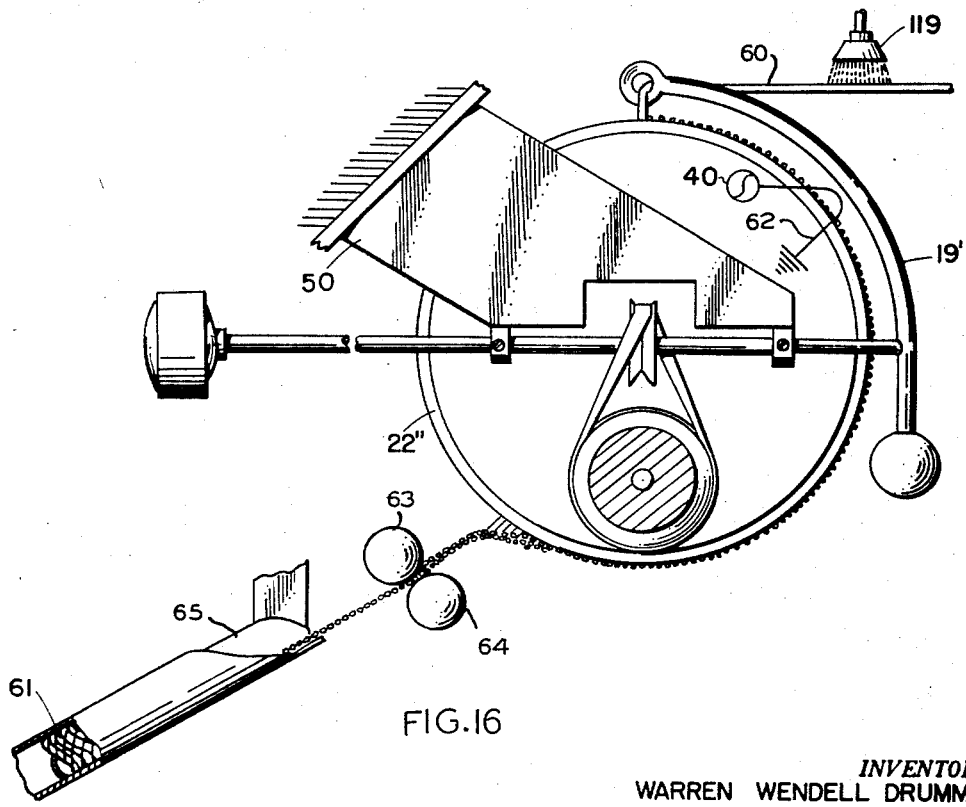
FIGURE 16 is a cross-sectional elevation of another embodiment of the machine of this invention.

In FIGURE 16 is shown another embodiment of this invention wherein a resinous materia is coated from applicator 119 onto fiber 60 and is polymerized or dryed. Fiber 60 after being coated with polymerizable resin, e.g. vinyl chloride, is wound on the winding head comprising member 22" where it is operably cut by means of heated wire 62, which can be electrically heated by generator 40 or by other operable means, before being passed through pinch rolls 63 and 64 and formed around heated mandrel 65. Mandrel 65 is heated to a temperature sufficient to polymerize the resin coating on the fiber and fiber reinforced resin tube 61 is provided. If desired, the fiber tube may have additional resin coated thereon or be formed or cut into configurations other than tubular.

Thermoplastic synthetic resins such as polyethylene, vinyl chloride, vinylidene chloride, vinyl acetate, vinyl alcohol, vinyl butyrate, tetrafluoro ethylene polymer, polystyrene, polypropylene, acetal polymer, polymethyl methacrylate, celluose acetate, cellulose acetate butyrate, polyethylene terephthalate, and other vinyl cellulosic and acrylic polymers can be used. Thermosetting resin such as diallylphthalate, furan, melamine formaldehyde, phenol formaldehyde, phenol furfural, urea formaldehyde, reaction products of chlorohydrin and fatty acids, and other polyester and polyether synthetic resins can be used. For those resins such as polyurethane wherein polymerization takes place without thermal activation the second reactant can be sprayed onto the fiber as the fiber enters the heated die, pinch roll or other means which may be provided to heat the fiber.

Figure 17:
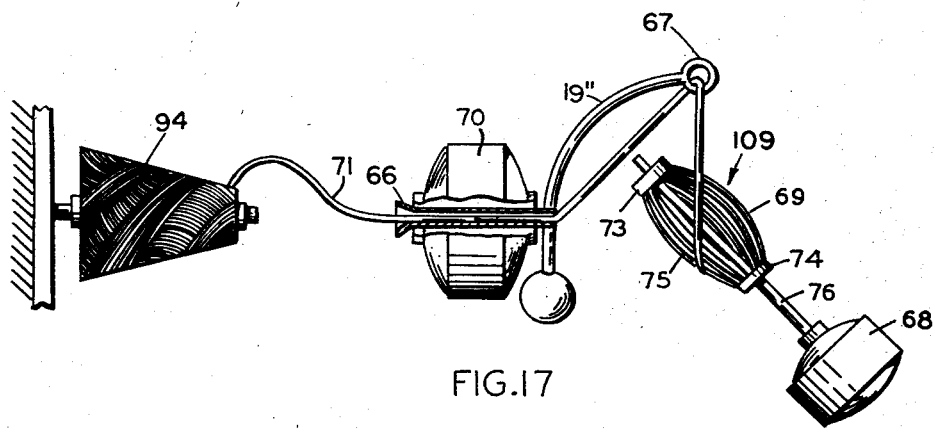
FIGURE 17 is an elevation in cutaway of another embodiment of the machine of this invention.

In FIGURE 17 is shown another embodiment of the invention wherein fiber 71 is withdrawn from spool 94 and is threaded through hollow shaft 66 of electric motor 70 and through eyelet 67 of flyer 19". Rotation of flyer 69 winds fiber 71 onto expandable spool 109. The spool is configured having two slidable collars 73 and 74 with resilient flexible stays 69 connected to the collars and disposed therebetween in a manner which enables collars 73 and 74 to be moved axially along shaft 76 on motor 68. A "Japanese lantern" type of spool is thus provided which can be configured substantially spherically by moving collars 73 and 74 into closer adjacency than is shown in FIGURE 17. Fiber 71 may then be wound evenly thereon into a substantially spherical ball, and then collars 73 and 74 may be moved axially apart along shaft 76 thereby collapsing spool 75 into a cylindrical core member which can be withdrawn from the ball wound thereon, or, if desired, left in expanded form and the spool and ball be packaged and shipped together. After unwinding of the ball the spool may then be returned to the shipper for re-use. If the spool is collapsed and withdrawn from the ball before packaging and shipping, a simple flat or cylindrical core can be inserted in the package for shipping and be replaced by an expandable core for unwinding. In operation motor 70 causes flyer 19" to revolve and motor 68 causes spool 109 to be rotated, thereby providing a conventional ball package.

Figure 18:
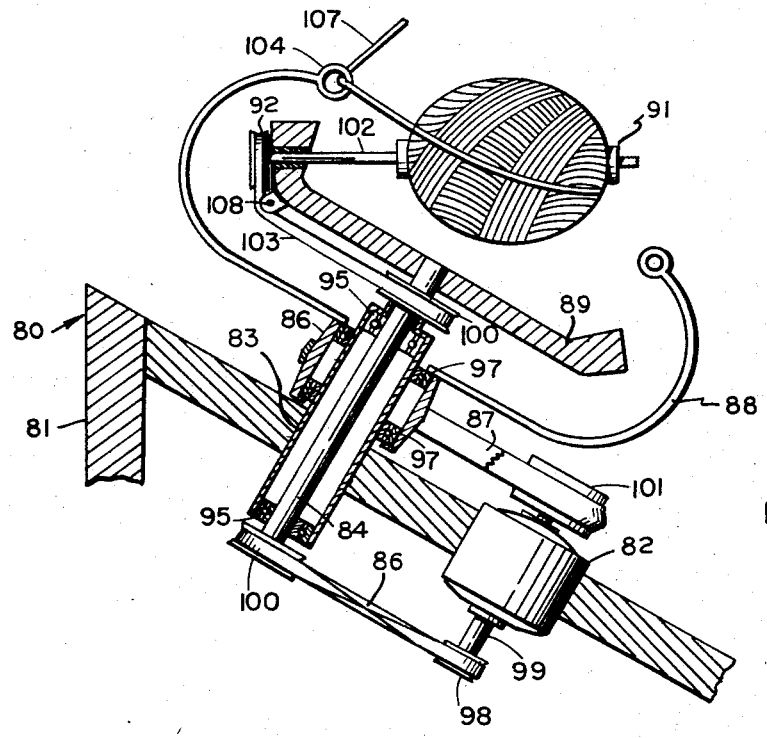
FIGURE 18 is a cross-sectional elevation of another embodiment of the machine of this invention.

In FIGURE 18 is shown another embodiment of this invention wherein machine 80 comprises rigid support 81 on which motor 82 and hollow shaft 83 are fixedly mounted. Pulley 100 is fixedly attached to shaft 84. Inner rotatable shaft 84 is coaxially mounted with fixed shaft 83 by bearing means 95 and outer rotatable shaft 86 is coaxially mounted with fixed shaft 83 by bearing means 97. Three coaxial shafts are thus provided, the middle member of which is stationary and the innermost and outermost members of which can be counter-rotated with respect to each other. Belt 86 operably connects pulley 98 mounted on drive shaft 99 of motor 82 with pulley 100 mounted on shaft 84. Belt 86' is provided with a half-twist. Belt 87 operably connects pulley 101 on motor shaft 99 with shaft 86 and is not provided with a half-twist so that shaft 86 and shaft 84 will be counter-rotated by shaft 99 of drive motor 82. Flyer 88 is affixed to shaft 86 and member 89 is affixed to shaft 84, the two elements being counter-rotatable with respect to each other by reason of their attachment to counter rotatable shafts 86 and 84. Pulley 92 is fixedly attached to spindle 102. Spindle 102 is rotatively mounted in member 89 and is rotated by means of belt 103 connected thereto and to pulley 100. Belt 103 passes over two idler pulleys 108 mounted on coincident axes and undergoes a change in direction in passing thereover. Pulley 100 is mounted on frame 81. Rotation of member 89 causes pulley 92 to be rotated by means of belt 103 because the rotation of member 89 and belt 103 around pulley 100 cause belt 103 to be translationally displaced, thereby causing spindle 102 on which a spool 91 is detachably fixed to be rotated. Fiber 107 may be threaded through eyelet 104 in the end extremity of flyer 88 as shown to provide a high-speed machine with three degrees of motion, i.e., rotation and revolution of spindle 102 and revolution of eyelet 104 on flyer 88 through which the yarn is threaded.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

What is claimed is:

1. Apparatus for forming a ribbon composed of a plurality of partially overlapped loops of filaments comprising a pair of substantially hemispherical shells, means mounting said shells for rotation with their largest diameter edges in registration but spaced apart to leave an opening therebetween, a rotating filament guide disposed to lay a succession of filament loops on the rotating surfaces of said shells with each loop spanning said opening, means rotating said shells in unison, and means stripping the ribbon of loops so formed therefrom, said driving means comprising a driven member disposed within said shells and having driving engagement therewith and a driving member extending through said opening and connected to drive said driven member.

2. Apparatus as set forth in claim 1 in which the means driving said shells comprises a driven roll disposed to engage frictionally the inner surfaces of said shells.

3. Apparatus as set forth in claim 1 in which said driven member includes gear means disposed to drive said shells.

4. Apparatus as set forth in claim 1 in which heating means is disposed to sever said loops in the opening between said shells.

5. Apparatus as set forth in claim 4 in which the heating means comprises a burner having a flame disposed to sever said filaments as said shells rotate.

6. Apparatus as set forth in claim 4 in which said heating means comprises a hot wire disposed to engage and sever the filaments of said loops as the shells rotate.

7. Apparatus as set forth in claim 1 including means for severing the filaments in said loops in the opening between said shells.

References Cited

UNITED STATES PATENTS 2,742,737   4/1956   McElroy.
2,889,610   6/1959   Buddecke.
3,120,689   2/1964   Drummond.

ROBERT R. MACKEY, *Primary Examiner.*

U.S. Cl. X.R.

28—21